United States Patent [19]
McLaughlin et al.

[11] Patent Number: 6,119,246
[45] Date of Patent: Sep. 12, 2000

[54] ERROR COLLECTION COORDINATION FOR SOFTWARE-READABLE AND NON-SOFTWARE READABLE FAULT ISOLATION REGISTERS IN A COMPUTER SYSTEM

[75] Inventors: Charles Andrew McLaughlin, Round Rock; Alongkorn Kitamorn; Sayileela Nulu, both of Austin, all of Tex.

[73] Assignee: International Business Machines Corporation, Armonk, N.Y.

[21] Appl. No.: 08/829,018

[22] Filed: Mar. 31, 1997

[51] Int. Cl.[7] .................................................. G06F 11/00
[52] U.S. Cl. ................ 714/27; 714/20; 714/30; 714/15; 714/34; 714/38; 714/42; 714/54; 364/265; 364/267; 364/268; 364/268.9; 364/280
[58] Field of Search .................. 395/182.18, 182.13, 395/183.1, 183.03; 364/265, 267, 268, 268.9, 280; 714/25, 27, 30, 34, 38, 42, 54, 15, 20

[56] References Cited

U.S. PATENT DOCUMENTS

| | | | |
|---|---|---|---|
| 4,044,337 | 8/1977 | Hicks et al. | 364/200 |
| 4,095,268 | 6/1978 | Kobayashi et al. | 364/200 |
| 4,215,397 | 7/1980 | Hom . | |
| 4,342,084 | 7/1982 | Sager et al. | 364/228.1 |
| 4,360,917 | 11/1982 | Sindelar et al. | 371/49 |
| 4,511,982 | 4/1985 | Kurakake | 364/167 |
| 4,604,746 | 8/1986 | Blum | 371/25 |
| 4,965,717 | 10/1990 | Cutts, Jr. et al. . | |

(List continued on next page.)

FOREIGN PATENT DOCUMENTS

| | | | |
|---|---|---|---|
| 811929A2 | 12/1997 | European Pat. Off. | G06F 13/40 |
| WO9700480 | 1/1997 | WIPO | G06F 13/14 |

OTHER PUBLICATIONS

IBM Technical Disclosure Bulletin, "Programmed Clock Synchronization In A Skewed Clock Environment", vol. 26, No. 8, Jan. 1984.

IBM Technical Disclosure Bulletin, "Recovery from Single Critical Hardware Resource Unavailability", vol. 26, No. 08, Aug. 1993.

IBM Technical Disclosure Bulletin, "Method to Initialize the Error Handling Logic of a Peripheral Component Interconnect System", vol. 37, No. 08, Aug. 1994.

IBM Technical Disclosure Bulletin, "BUS Fault Identification Algorithm", vol. 21, No. 6A, Nov. 1989.

PCI System Architecture, "Chapter 10: Error Detection and Handling", 189–207.

*Primary Examiner*—Ayaz R. Sheikh
*Assistant Examiner*—Frantz Blanchard Jean
*Attorney, Agent, or Firm*—Sawyer & Associates; Volel Emile

[57] ABSTRACT

The present invention provides method and system aspects for performing error data gathering from fault isolation registers of a computer system following a machine check occurrence. A method aspect includes utilizing firmware to perform failure information retrieval in software accessible registers and initiating a service processor (SP) for failure data retrieval in non-software accessible registers. The method further includes coordinating the combination of the failure information retrieved and the failure data retrieved in an error log for use in isolation of a fault source in the computer system.

14 Claims, 3 Drawing Sheets

U.S. PATENT DOCUMENTS

| | | | |
|---|---|---|---|
| 5,133,071 | 7/1992 | Sato et al. | 364/234 |
| 5,142,165 | 8/1992 | Allard et al. | 307/130 |
| 5,193,181 | 3/1993 | Barlow et al. | 395/575 |
| 5,245,615 | 9/1993 | Treu | 371/16.5 |
| 5,249,187 | 9/1993 | Bruckert et al. | 371/68.1 |
| 5,251,227 | 10/1993 | Bruckert et al. | 371/12 |
| 5,254,615 | 10/1993 | Treu | 371/16.5 |
| 5,267,246 | 11/1993 | Huang et al. . | |
| 5,291,600 | 3/1994 | Lutz et al. | 395/700 |
| 5,307,482 | 4/1994 | Bealkowski et al. | 395/575 |
| 5,313,625 | 5/1994 | Hess et al. | 395/575 |
| 5,313,628 | 5/1994 | Mendelsohn et al. | 395/575 |
| 5,317,752 | 5/1994 | Jewett et al. | 395/750 |
| 5,375,219 | 12/1994 | Okabe . | |
| 5,390,324 | 2/1995 | Burckhartt et al. | 395/575 |
| 5,410,706 | 4/1995 | Farrand et al. | 395/700 |
| 5,421,006 | 5/1995 | Jablon et al. | 395/575 |
| 5,437,047 | 7/1995 | Nakamura | 395/800 |
| 5,442,777 | 8/1995 | Nakajima et al. | 395/182.18 |
| 5,444,859 | 8/1995 | Baker et al. | 395/575 |
| 5,450,579 | 9/1995 | Johnson | 395/650 |
| 5,455,933 | 10/1995 | Schieve et al. | 395/183.03 |
| 5,467,449 | 11/1995 | Gauronski et al. | 395/185.1 |
| 5,471,674 | 11/1995 | Stewart et al. | 395/650 |
| 5,475,839 | 12/1995 | Watson et al. | 395/650 |
| 5,487,148 | 1/1996 | Komori et al. | 395/182.02 |
| 5,488,688 | 1/1996 | Gonzales et al. | 395/183.1 |
| 5,499,346 | 3/1996 | Amini et al. | 395/308 |
| 5,530,847 | 6/1996 | Schieve et al. | 395/183.14 |
| 5,530,946 | 6/1996 | Bouvier et al. | 395/182.21 |
| 5,557,547 | 9/1996 | Phaal | 364/551.01 |
| 5,560,018 | 9/1996 | Macon, Jr. et al. . | |
| 5,560,033 | 9/1996 | Doherty et al. | 395/800 |
| 5,564,054 | 10/1996 | Bramnick et al. | 395/700 |
| 5,619,644 | 4/1997 | Crockett et al. | 395/183.21 |
| 5,680,537 | 10/1997 | Byers et al. | 395/182.03 |
| 5,712,967 | 1/1998 | Grossman et al. | 395/182.01 |
| 5,742,851 | 4/1998 | Sekine | 395/183.19 |
| 5,768,496 | 6/1998 | Lidgett et al. | 714/25 |
| 5,768,612 | 6/1998 | Nelson | 395/800.32 |
| 5,777,549 | 7/1998 | Arrowsmith et al. | 340/506 |
| 5,784,617 | 7/1998 | Greenstein et al. | 395/674 |
| 5,790,870 | 8/1998 | Hausauer et al. | 395/733 |
| 5,805,785 | 9/1998 | Dias et al. | 395/182.02 |

ERROR COLLECTION COORDINATION FOR SOFTWARE-READABLE AND NON-SOFTWARE READABLE FAULT ISOLATION REGISTERS IN A COMPUTER SYSTEM

CROSS-REFERENCE TO RELATED APPLICATIONS

The present application is related to applications Ser. No. 08/829,017, entitled "Method and System for Check Stop Error Handling," filed Mar. 31, 1997; Ser. No. 08/829,088, entitled "A Method and System for Fault Isolation for PCI Bus Errors," filed Mar. 31, 1997; Ser. No. 08/829,016, entitled "Machine Check Handling for Fault Isolation in a Computer System," filed Mar. 31, 1997; Ser. No. 08-829,089, entitled "Method and System for Reboot Recovery," filed Mar. 31, 1997; and Ser. No. 08-829,090, entitled "A Method and System for Surveillance of Computer System Operations," filed Mar. 31, 1997.

FIELD OF THE INVENTION

The present invention relates generally to fault isolation in a computer system and more particularly to coordination of failure data collection following machine check from software readable and non-software readable fault isolation registers of a computer system.

BACKGROUND OF THE INVENTION

When a hardware fault is detected in a digital computer system, the condition is often signalled to the CPU (central processing unit) with an interrupt called Machine Check, or Non-Maskable Interrupt (NMI). Generally, operating system contain NMI trace routines that are designed to trace errors or faults in the system features that are known as of the most recent version of the operating system program. Unfortunately, trace routines often lag the rapid addition of new features to computer systems, so that proper diagnosis of the source of the problem is not adequately performed.

Detailed information about the failure is often captured in special hardware registers, many of which can be read by software running on the CPU. Gathering the information from these registers also has complications. For example, some systems can be designed with both commercially available industry standard hardware and some "inhouse" designed hardware. In such a system, typically some error register implementations are memory mapped, which can be accessed via predefined processor instructions, while some error register implementations are non-memory mapped, which can be accessed via JTAG (Joint Test Action Group) scan only, usually by an embedded controller. While some implementations for error information gathering utilize a single method of data gathering, for example, OCS scans with saving of all scan ring data into non-volatile RAM, these implementations tend to limit the flexibility of the system designer.

Accordingly, what is needed is a method and system for accessing all available error information captured in the system, while avoiding potential side effects, such as loss of data or hardware states if error registers are accessed concurrently.

SUMMARY OF THE INVENTION

The present invention provides method and system aspects for performing error data gathering from fault isolation registers of a computer system following a machine check occurrence. A method aspect includes utilizing firmware to perform failure information retrieval in software accessible registers, and initiating a service processor (SP) for failure data retrieval in non-software accessible registers. The method further includes coordinating the combination of the failure information retrieved and the failure data retrieved in an error log for use in isolation of a fault source in the computer system.

In a further method aspect, a method includes performing failure information retrieval with the software accessible registers when a non-maskable interrupt occurs, and determining whether failure information retrieval utilizing a service processor (SP) is necessary. In addition, the method includes performing failure information retrieval from non-software accessible registers by utilizing the SP, and forming an error log with error data retrieved during the failure information retrieval steps.

In a computer system aspect, the computer system includes a processing mechanism and a firmware mechanism supported by the processing mechanism for performing failure information retrieval from software-readable registers. Also included is a service processor (SP) mechanism coupled to the processing mechanism, the SP mechanism performing failure information retrieval for non-software readable registers. Additionally, the system includes a memory mechanism coupled to the SP mechanism and the processing mechanism for storing failure information retrieved by the firmware mechanism and the SP mechanism in a predefined error log data structure.

With the present invention, all error information from different hardware implementations is capably utilized. Further, greater flexibility for system designers is achieved by allowing integration of hardware from multiple suppliers, which yields a more cost effective system design. Additionally, support of failure analysis of varying hardware implementations provides maximized system fault isolation. These and other advantages of the aspects of the present invention will be more fully understood in conjunction with the following detailed description and accompanying drawings.

DESCRIPTION OF THE INVENTION

The present invention relates to coordinated error data gathering in a computer system following a machine check. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
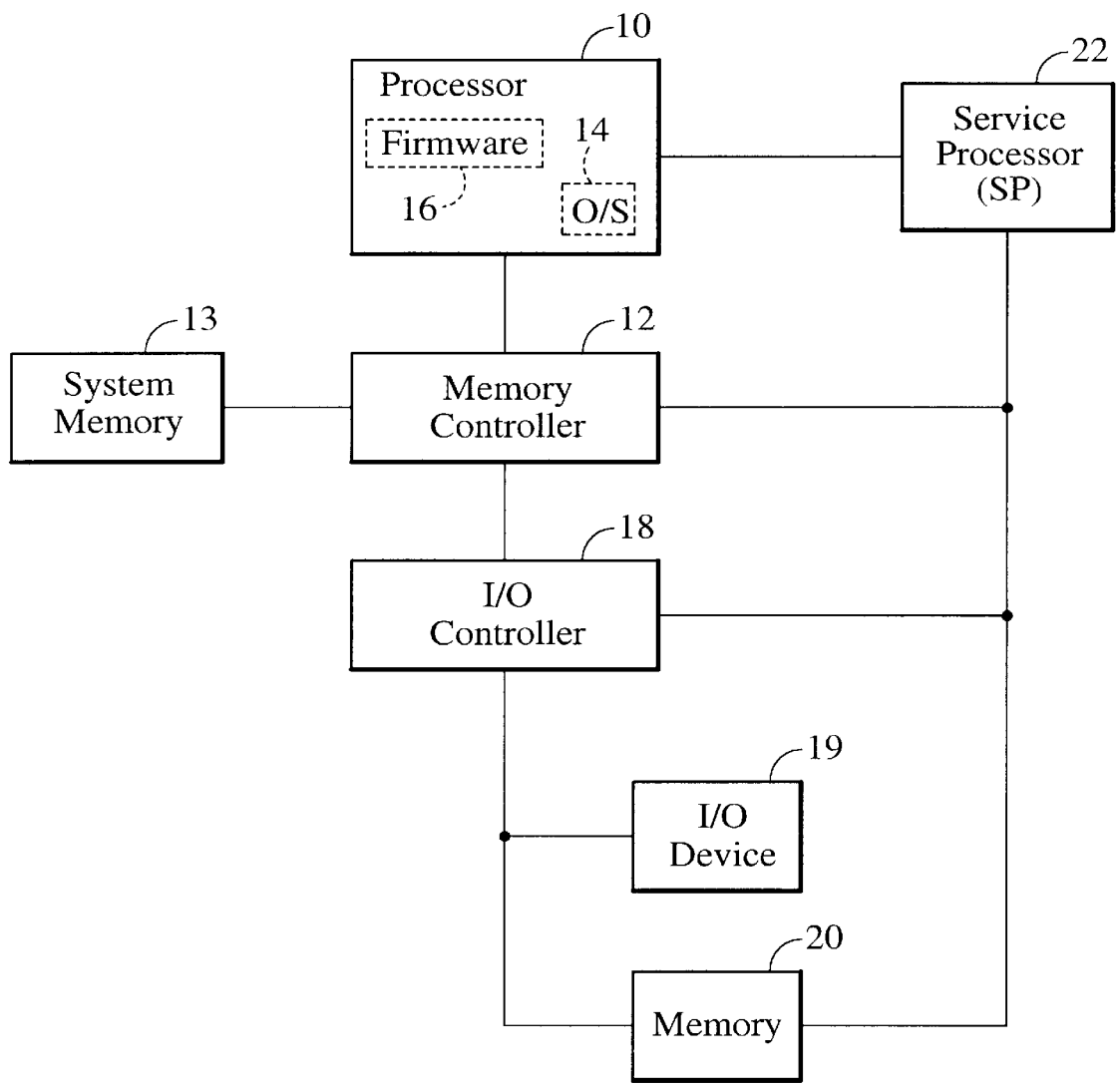
FIG. 1 illustrates a block diagram of a computer system in accordance with the present invention.

FIG. 1 illustrates a basic block diagram of a general purpose computer system for use with the present invention. As shown, the computer system includes a processor 10, such as a PowerPC™ processor from IBM Corporation, of Armonk, N.Y., coupled to memory controller 12, which controls system memory 13, i.e., RAM (random access memory) and ROM (read only memory). An operating system (O/S) 14 typically runs on the processor to perform basic tasks in the computer system and act as a platform for application programs. Also included is firmware 16 that runs on the processor 10 and is code stored in suitable memory, such as non-volatile RAM, or EPROM (erasably programmable read only memory), as is well understood to those skilled in the art Further, an input/output (I/O) controller 18 is coupled to the processor 10 for controlling the interactions between the processor 10 and sub-ordinate components, i.e., sub-components, such as input/output devices 19, e.g., a hard disk drive, a monitor, etc., that adhere to an input/output standard, such as a PCI standard, and a memory device 20, such as non-volatile RAM (NVRAM). Further included is an embedded controller, i.e., a service processor (SP) 22. The SP 22 suitably accesses components with non-memory mapped failure isolation registers to extract failure information from a scan string. Specific error bits are made more accessible through linking of the bits into a limited series that is directly accessible with a special access command, as defined by IEEE standard 1149.1, often referred to by the name of the originators JTAG (Joint Test Action Group).

In determining failure information, the present invention takes advantage of a PowerPC™ Common Hardware Reference Platform (CHRP) architecture that defines a mechanism for hardware platforms to provide special firmware, called Run-Time Abstraction Services (RTAS), that can be accessed from a running operating system. A description of the features of CHRP may be found in *PowerPC™ Microprocessor Common Hardware Reference Platform: A System Architecture*, published by Morgan Kaufman Publishers, Inc., San Francisco, Calif., 1995. The special firmware has characteristics similar to BIOS in Intel systems. Since the special firmware is tailored to the specific hardware it runs on, it supports storage of extensive knowledge about failure information available in fault isolation registers throughout the various components in the system. The present invention provides a mechanism for coordinating the collection of failure information from fault isolation registers that are memory-mapped within the computer system and those that are not memory-mapped within the computer system.

Figure 2:
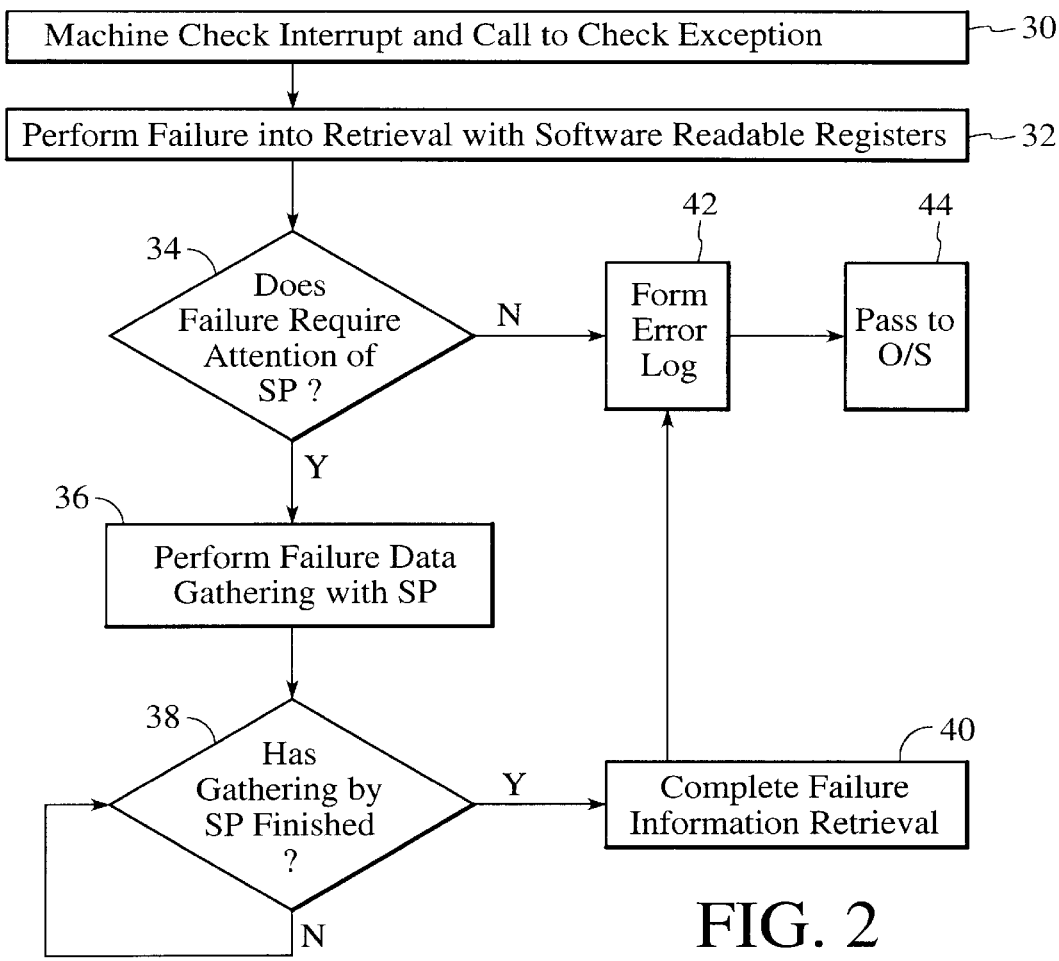
FIG. 2 illustrates a flow diagram of coordination of failure information gathering with software readable registers and non-software readable registers.

FIG. 2 illustrates a flow diagram of the coordination of failure information gathering from software readable, i.e., memory-mapped, registers and from registers dynamically accessible through JTAG, i.e., non-memory mapped registers. The process begins upon receipt of a machine-check interrupt signal in the O/S 14 of the computer system which initiates a call to a check exception function (step 30) supported by RTAS. The process continues by performing failure information retrieval with the software-readable registers (step 32). Preferably, the gathering of the failure information from the software-readable registers occurs according to a procedure described in co-pending U.S. patent application, Ser. No. 08-829,016, entitled "Machine Check Handling for Fault Isolation in a Computer System", assigned to the assignee of the present invention, and filed on the same date as the present application, the disclosure of which is hereby incorporated herein.

During the failure information gathering of the software-readable registers, a determination of whether the type of failure would require the attention of the SP 22 (FIG. 1) is made (step 34). If the failure would require the attention of the SP 22, the process continues by performing failure information gathering on the non-software readable registers with the SP 22 (step 36), the details of which are presented with reference to FIG. 3. Once the gathering by the SP 22 is over, as determined via step 38, the information gathering is completed by reading the data stored by the SP 22 (step 40). An error log is then formed (step 42) by the firmware 16 (FIG. 1), which combines the information gathered in steps 32 and 36 into a data structure, a preferred format for which is presented with reference to FIG. 4. The error log is then passed to the operating system 14 (step 44) for failure isolation analysis. Suitably, the error log is saved to a private O/S partition in the memory device 20 or on disk, and when saved in memory device 20, may be suitably retrieved by the operating system 14 after re-boot before being saved to disk.

Figure 3:
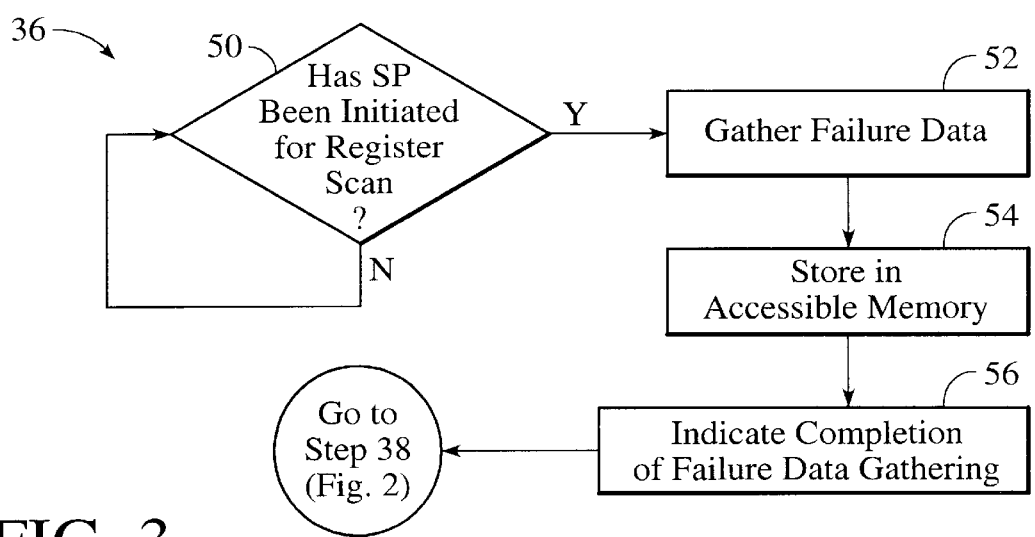
FIG. 3 illustrates a flow diagram detailing a process of utilizing a service processor to perform a failure data gathering step of FIG. 2.

Referring to FIG. 3, a flow diagram illustrates a preferred process of utilizing the SP 22 to perform failure data gathering from JTAG accessible registers (step 34 of FIG. 2). The process begins with a determination of whether the SP 22 has been initiated for a register scan (step 50). Preferably, initiation of a register scan by the SP 22 occurs via a communication mechanism from the firmware 16 to the SP 22. In one embodiment, the communication mechanism occurs as an attention signal which is sent to the SP 22 to inform the SP 22 of the occurrence of the machine check interrupt. Suitably, the SP 22 then checks a defined semaphore in memory device 20 to identify when the error scan can begin. If and when the firmware 16 needs additional error information, the semaphore is set to "1", so that the SP 22 can begin the error scan. Alternatively, the communication mechanism utilizes a desired, unique command protocol in the firmware 16 that is defined to inform the SP 22 to start error scan without requiring the use of a semaphore.

Once the SP 22 has been initiated to perform error scan, the SP 22 gathers failure isolation register information from the JTAG accessible registers (step 52). The data gathered is suitably saved in the memory device 20, so as to be accessible to both the SP 22 and the firmware 16 (step 54). Upon completion of error scan and save, the SP 22 appropriately indicates error scan completion to firmware 16 (step 56). By way of example, for the semaphore communication mechanism embodiment, the SP 22 suitably sets the defined semaphore to "0". Alternatively, for the command protocol approach, the SP 22 suitably issues a pre-defined return code to the firmware 16.

Figure 4:
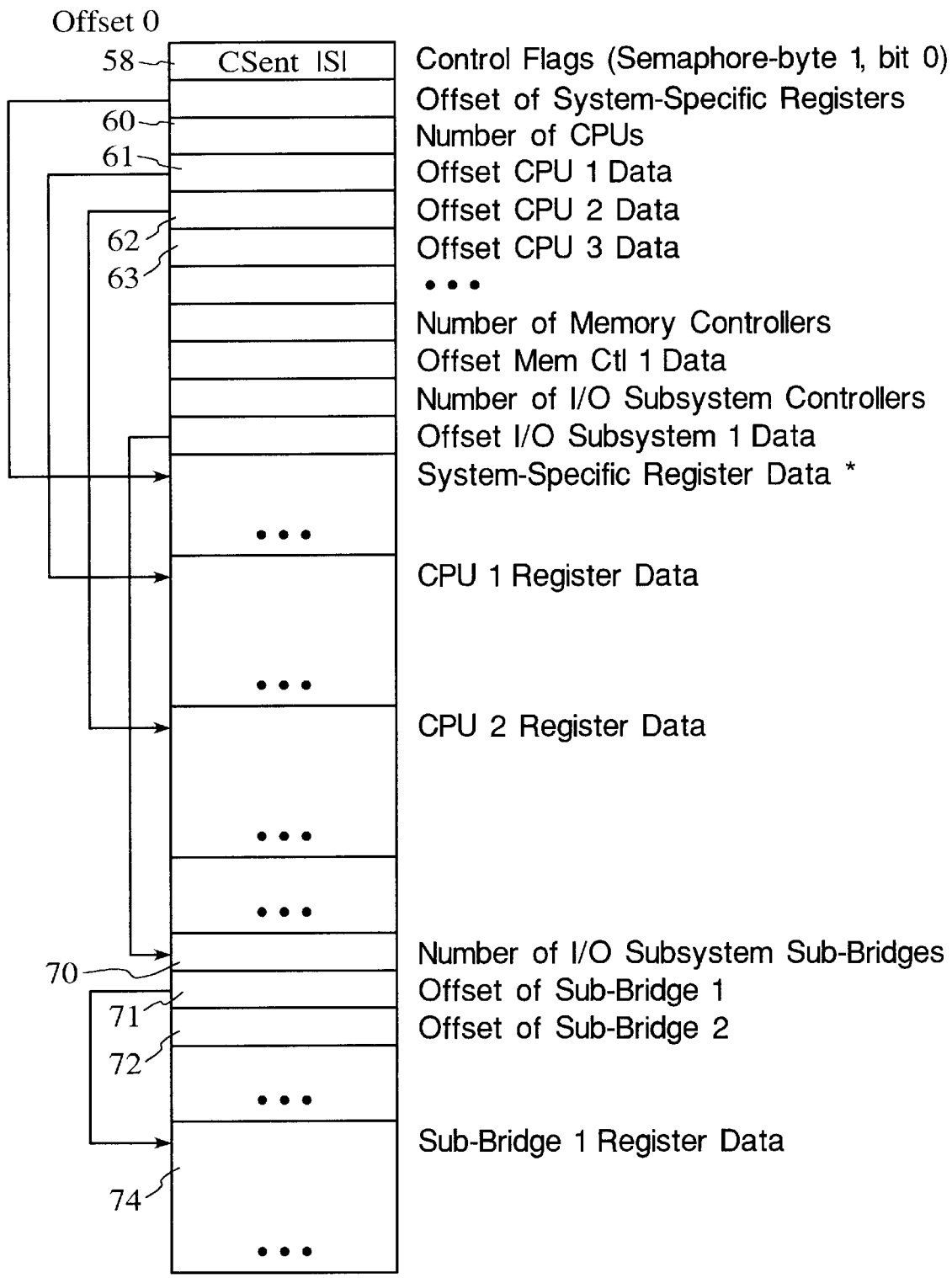
FIG. 4 illustrates a data structure for storing error data in accordance with the present invention.

Once the SP 22 has indicated completion of its error scan operations, the process continues from step 38, FIG. 2, which is now affirmative. The firmware 16 then completes retrieval of the error information gathered by the SP 22 (step 40). Suitably the error log formed (step 42, FIG. 2) following completion of the failure information gathering has a general layout as illustrated in FIG. 4. In general, the error log contains the mapping of the gathered data into an abstracted format, which preferably describes the type of error as well as the failing component location. The error log is then passed back to the operating system 14 (step 44), and the procedure of failure data gathering is completed until the next machine check interrupt.

Preferably, the error data gathered has a general structure similar to the platform hardware layout so as to ease the extraction and analysis of data. Of course, support for multiple instances of register values for specific chips is necessary due to the possibility of multiple processors, memory controllers, I/O bridges, etc., in the system. Thus, as shown in FIG. 4, in addition to a control flag entry 58, which capably supports the use of a semaphore, the error log suitably includes entries, e.g., entries 60–63, that indicate the number of each device type and the offset to the data corresponding to each device. By way of example, the offsets or numbers are provided as two-byte values with the register data depending upon the actual size of the registers and the data from system specific registers, e.g., registers from chips other than basic CPU, memory controller or I/O chips, such as from bus arbitration chips, etc. Thus, specific numbers and bit definitions will vary among platforms.

By way of further example, support for nested I/O subsystems, e.g., remote I/O subsystems, which contain three levels of nested bus bridges, is included, e.g., entries 70, 71, 72, 74. Preferably, the I/O subsystem data areas contain nested numbers and pointers to additional information about sub-bridge instances. Of course, the technique could be applied to other forms of sub-systems, if necessary. Further, in cases where the SP 22 does not have scan access to I/O subsystem error registers down to the lowest level of bridges, the partition suitably only defines and contains nested sub-bridge information to the level that is available.

With the provision of an error log within a specific partition of memory device 20, a common area in the system is provided, which can be accessed by both the firmware 16 and SP 22 for passing the error information. This common area is suitably provided by NVRAM, but other memory implementations may be used providing that there is a common predefined data structure that both the firmware 16 and SP 22 can utilize.

With the present invention, all error information from hardware components that have been implemented in varying manners is capably retrieved and utilized in isolating an error source. Further, the coordinated gathering of error data supports greater flexibility in system design. Additionally, such improved error data gathering and error source isolation reduces overall system maintenance costs.

Although the present invention has been described in accordance with the embodiments shown, one of ordinary skill in the art will readily recognize that there could be variations to the embodiments and those variations would be within the spirit and scope of the present invention. For example, although the present invention is described in terms of a uniprocessor system, the aspects are also suitable for multiprocessor systems. Accordingly, many modifications may be made by one of ordinary skill in the art without departing from the spirit and scope of the appended claims.

What is claimed is:

1. A method for coordinating failure information retrieval from non-software accessible registers and software accessible registers of a computer system, the method comprising:

performing failure information retrieval with the software accessible registers when a non-maskable interrupt occurs;

determining whether failure information retrieval utilizing a service processor (SP) is necessary;

performing failure information retrieval from non-software accessible registers by utilizing the SP by initiating the SP for register scan through receiving an attention signal and determining if a semaphore indicator has been set; and forming an error log with error data retrieved during the failure information retrieval steps.

2. The method of claim 1 further comprising gathering failure information from the non-software accessible registers and storing the failure information in a predefined storage area.

3. The method of claim 2 further comprising indicating completion of the gathering.

4. The method of claim 3 wherein indicating completion further comprises releasing a semaphore indicator.

5. The method of claim 3 wherein indicating completion further comprises issuing a predefined return code.

6. The method of claim 3 wherein the predefined storage area comprises a partition of a nonvolatile random access memory (NVRAM).

7. A method for performing error data gathering from fault isolation registers of a computer system following a machine check occurrence, the method comprising:

utilizing firmware to perform failure information retrieval in software accessible registers;

initiating a service processor (SP) for failure data retrieval in non-software accessible registers by receiving an attention signal and determining if a semaphore indicator has been set; and coordinating the combination of the failure information retrieved and the failure data retrieved in an error log for use in isolation of a fault source in the computer system.

8. The method of claim 7 wherein coordinating the combination further comprising utilizing a storage area commonly accessible to the firmware and the SP for the error log.

9. The method of claim 8 wherein utilizing further comprises utilizing a predefined partition of a memory device for forming the error log with a desired data structure.

10. The method of claim 9 wherein the memory device comprises a nonvolatile random access memory (NVRAM).

11. A computer system capable of identifying a source of a machine check condition from data in failure isolation registers, the computer system comprising:

processing means;

firmware means supported by the processing means for performing failure information retrieval from software-readable registers;

service processor (SP) means coupled to the processing means, the SP means performing failure information retrieval for non-software readable registers and being initiated for register scan by receiving an attention signal and determining if a semaphore indicator has been set; and memory means coupled to the SP means and the processing means for storing failure information retrieved by the firmware means and the SP means in a predefined error log data structure.

12. The computer system of claim 11 wherein the processing means further supports an operating system, the operating system isolating a fault condition from the predefined error log data structure.

13. The computer system of claim 11 wherein the memory means comprises a nonvolatile random access memory (NVRAM).

14. The computer system of claim 11 wherein the firmware means initiates the SP means for failure information retrieval.

* * * * *